(12) United States Patent
Kurabayashi

(10) Patent No.: US 9,952,704 B2
(45) Date of Patent: Apr. 24, 2018

(54) ANNULAR USER INTERFACE

(71) Applicant: EMPIRE TECHNOLOGY DEVELOPMENT LLC, Wilmington, DE (US)

(72) Inventor: Shuichi Kurabayashi, Kanagawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/026,611

(22) PCT Filed: Oct. 4, 2013

(86) PCT No.: PCT/US2013/063334
§ 371 (c)(1),
(2) Date: Apr. 1, 2016

(87) PCT Pub. No.: WO2015/050554
PCT Pub. Date: Apr. 9, 2015

(65) Prior Publication Data
US 2016/0246421 A1    Aug. 25, 2016

(51) Int. Cl.
*G06F 3/041* (2006.01)
*G06F 3/044* (2006.01)
*G06F 1/16* (2006.01)
*G06F 3/0354* (2013.01)

(52) U.S. Cl.
CPC .......... *G06F 3/0414* (2013.01); *G06F 1/169* (2013.01); *G06F 1/1626* (2013.01); *G06F 1/1632* (2013.01); *G06F 1/1656* (2013.01); *G06F 3/03547* (2013.01); *G06F 3/044* (2013.01); *G06F 3/0416* (2013.01); *G06F 2203/0339* (2013.01); *G06F 2203/04105* (2013.01)

(58) Field of Classification Search
CPC .................................. G06F 3/014; G06F 3/044
See application file for complete search history.

(56) References Cited

U.S. PATENT DOCUMENTS

| | | |
|---|---|---|
| 5,355,148 A | 10/1994 | Anderson |
| 7,840,912 B2 | 11/2010 | Elias et al. |
| 8,341,558 B2 | 12/2012 | Li |
| 2005/0212756 A1* | 9/2005 | Marvit ............... G06F 1/1626 345/156 |
| 2006/0082556 A1 | 4/2006 | Baker et al. |

(Continued)

OTHER PUBLICATIONS

"iPad usability Research Report", THINKJAM, Retrieve from <URL: https://web.archive.org/web/20130725092917/http://www.thinkjam.co.jp/discovery/wo/011/> on Mar. 17, 2016, posted on Jul. 12, 2011, Jakob Nielsen, pp. 11.

(Continued)

*Primary Examiner* — Lixi C Simpson
(74) *Attorney, Agent, or Firm* — Turk IP Law, LLC

(57) ABSTRACT

Technologies are generally described for a user interface system configured to detect a user's action. In various examples, an electronic device operable by a user may include an annular sensor and a processor. The annular sensor may be configured to detect a touch input. The processor may be operatively coupled to the annular sensor, and configured to determine an action by the user that corresponds to the touch input.

27 Claims, 14 Drawing Sheets

(56) References Cited

U.S. PATENT DOCUMENTS

| | | | | |
|---|---|---|---|---|
| 2009/0251407 | A1* | 10/2009 | Flake | G06F 3/014 345/156 |
| 2010/0149127 | A1 | 6/2010 | Fisher et al. | |
| 2011/0210931 | A1* | 9/2011 | Shai | G06F 3/014 345/173 |
| 2012/0075196 | A1* | 3/2012 | Ashbrook | G06F 3/014 345/173 |
| 2013/0181927 | A1 | 7/2013 | Madonna et al. | |
| 2013/0335380 | A1* | 12/2013 | Griffin | G06F 3/03545 345/179 |
| 2014/0267139 | A1* | 9/2014 | Slaby | G06F 3/044 345/174 |

OTHER PUBLICATIONS

"How to: BlackBerry 8800 Keyboard Shortcuts", Retrieve from <URL: https://web.archive.org/web/20130404173052/http://mobilewirelessnews.com/2007/03/14/how-to-blackberry-8800-keyboard-shortcuts/ on Jan. 3, 2016, Mobile Wireless News, posted on Mar. 14, 2007, pp. 11.

Laura Varley, "Ringbow Thumb Controller Could Revolutionize Touchscreen Gaming", Retrieve from <URL:http://web.archive.org/web/20130711034809/http://www.geek.com/games/ringbow-thumb-controller-could-revolutionize-touchscreen-gaming-1498617/> on Mar. 17, 2016, posted on Jun. 25, 2012, pp. 3.

Emma Hutchings, "Nokia's Ring That Can Control Your Mobile Phone", Retrieve from <URL:https://web.archive.org/web/20120823021602/http://www.psfk.com/2011/04/nokias-ring-that-can-control-your-mobile-phone.html> on Jan. 3, 2016, posted on Apr. 13, 2011, PSFK, pp. 2.

"CellHandle Lets You Give Your Phone The Finger", RunAroundTech, Retrieve from <URL:http://www.runaroundtech.com/2011/06/24/cellhandle-gives-you-one-fingered-grip-on-your-phone/> on Aug. 14, 2012, posted on Jun. 24, 2011, pp. 8.

Matt Brian, "TNW Review: The Flygrip Helps You Get to Grips with Your Portable Gadgets . . . Quite Literally", Retrieve from <URL: http://thenextweb.com/gadgets/2012/08/08/tnw-review-the-flygrip-helps-you-get-to-grips-with-your-portable-gadgets-quite-literally/> on Aug. 14, 2012, posted on Aug. 8, 2012, pp. 5.

Raluca Budiu et al., "Usability of iPad Apps and Websites", 2nd Edition, Nielsen Norman Group, Jun. 6, 2011, pp. 1-119.

International Search Report and Written Opinion of the International Searching Authority, International application No. PCT/US2013/063334, dated Apr. 25, 2014.

"Smart Phone Reliability: Apple iPhones with Fewest Failures, and Major Android Manufacturers not Far Behind", Square Trade Research Brief, Nov. 3, 2010, pp. 9.

* cited by examiner

ANNULAR USER INTERFACE

CROSS-REFERENCE TO RELATED APPLICATION

The present application is a U.S. national stage filing under 35 U.S.C. § 371 of International Application No. PCT/US2013/063334, filed Oct. 4, 2013 and entitled "ANNULAR USER INTERFACE." The International Application, including any appendices or attachments thereof, is incorporated by reference herein in its entireties.

BACKGROUND

Unless otherwise indicated herein, the approaches described in this section are not prior art to the claims in this application and are not admitted to be prior art by inclusion in this section.

Many types of input means are available for performing operations in an electronic device, such as a keyboard, a keypad, a mouse, a pen, a trackball, a joystick, a touch sensor panel, a touch screen, a motion controller, a voice input device, and the like. Handheld devices such as smartphones, mobile phones, personal digital assistants (PDAs), tablets and mobile game consoles, etc., increasingly employ touch screens among the various input means.

Due to the small size of the touch screens, users of the handheld devices often experience pointing errors or input errors. For example, when a user selects one of links in a page displayed on a touch screen, the user may unintentionally select the wrong link due to the size of the screen and the size of the user's finger improperly touching the wrong link. Such errors may significantly harm user experience. Further, since much of the touch screens employ glass as an insulator, the handheld devices with the touch screens may be vulnerable to drop damage.

SUMMARY

Technologies are generally described for a user interface system configured to detect a user's action.

Various example electronic devices operable by a user described herein may include an annular sensor and a processor. The annular sensor may be configured to detect a touch input. The processor may be operatively coupled to the annular sensor, and configured to determine an action by the user that corresponds to the touch input from the annular sensor.

In some examples, an electronic device is described that may be configured to detect a user's action with an annular sensor such as any example annular sensors described herein. The electronic device may include a touch input receiver unit and an action determination unit. The touch input receiver unit may be configured to receive a touch input from the annular sensor. The action determination unit may be configured to determine the user's action that corresponds to the touch input received by the touch input receiver unit. The action determination unit may be configured to determine the user's action based at least in part on the touch input and a list of candidate actions.

In some examples, a method for an electronic device is described such as any example methods described herein that may be performed by any example electronic devices described herein. The electronic device may be operatively coupled to an annular sensor and configured to detect a user's action with the annular sensor. In accordance with the example method, the electronic device may receive from the annular sensor a touch input, compare the received touch input with candidate actions, and select the user's action corresponding to the touch input amongst the candidate actions based at least in part on the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
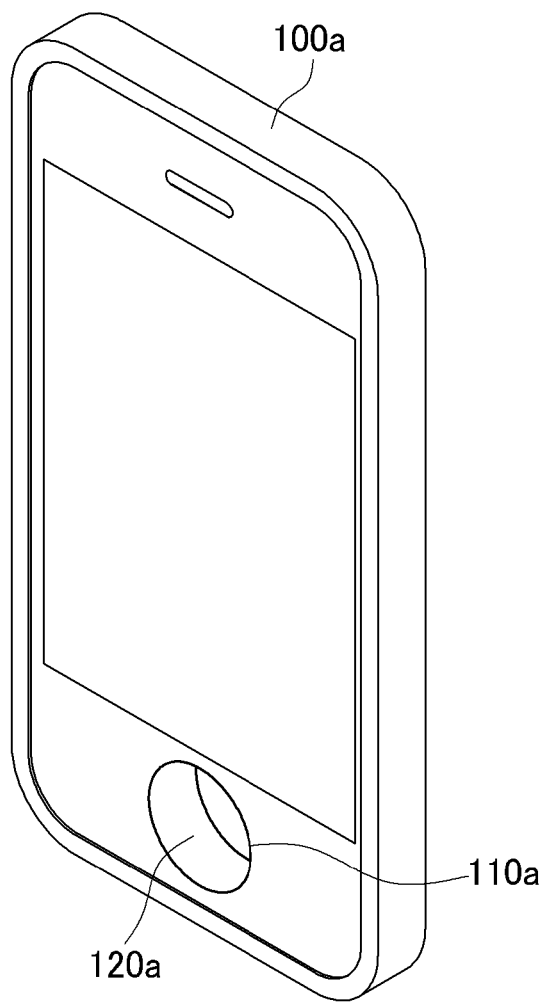
FIG. 1A schematically shows a front perspective view of an illustrative example electronic device with an annular sensor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

This disclosure is generally drawn, inter alia, to methods, apparatus, systems, devices and computer program products related to a user interface system configured to detect a user's action.

Briefly stated, technologies are generally described for a user interface system configured to detect a user's action with an annular sensor. In various examples, the annular sensor may be mounted on or operatively coupled to an electronic device. The annular sensor may detect a touch input from a user (e.g., a finger of the user), and provide the touch input to the electronic device. The annular sensor may include, but is not limited to, a pressure sensor that may be configured to detect a pressure associated with operation of the annular sensor by the user, and/or a capacitive sensor that may be configured to detect a contact between the annular sensor and the user associated with operation of the annular sensor by the user.

In some embodiments, the electronic device may be further configured to determine an action by the user that corresponds to the touch input detected by the annular sensor. The electronic device may be of any type of portable electronic device configured to interact with the user, including, for example, a smartphone, a mobile phone, a personal digital assistant (PDA), a tablet, a laptop, a mobile game console, etc.

In some embodiments where the annular sensor is mounted on the electronic device, the electronic device may include a ring-shaped member including an inside surface. In such cases, the annular sensor may be mounted to the inside surface of the ring-shaped member. The ring-shaped member may be provided as a through-hole of the electronic device, or installed on any exterior surface of the electronic device.

In some embodiments where the annular sensor is not physically mounted on the electronic device, the annular sensor may be configured to provide the touch input to the electronic device wirelessly. In such cases, the annular sensor may provide the touch input to the electronic device using a wireless protocol such as, for example, Bluetooth, Wi-Fi, RF (radio frequency), Zigbee, infrared, or any other appropriate wireless communication protocol. By way of example, but not limitation, the annular sensor may be mounted on a housing or case for the electronic device, and the user may use the annular sensor as an input means for the electronic device by wearing the housing or case on the electronic device.

In some embodiments, the user may manipulate the electronic device by touching the annular sensor, for example, with his/her finger. In this regard, the annular sensor may provide the user with another input means in addition to existing input means such as, for example, a touch screen or a keypad. The annular sensor may also provide the user with a holding means allowing the user hold or grip the electronic device easily and/or securely, thereby reducing damage due to slippery from the user's hand.

In some embodiments, one or more components of the electronic device may be adapted to detect the action with the annular sensor. Each function and/or operation of components of the electronic device may be implemented, individually and/or collectively, by a wide range of hardware, software, firmware, or virtually any combination thereof.

In some embodiments, the electronic device may be configured to receive the touch input from the annular sensor, and determine the user's action that corresponds to the touch input based at least in part on the touch input and a list of candidate actions. The candidate actions may vary based on an application executed on the electronic device such that different applications may correspond to different candidate actions.

In some embodiments, the electronic device may be configured to compute similarity between the touch input and each of the candidate actions, and select one of the candidate actions that has a highest computed similarity as the action associated with the touch input. By way of example, but not limitation, the electronic device may transform the touch input and the candidate actions into a matrix, rows and/or columns of which may correspond to touch positions and/or touch times, and compute the similarity based on the matrices.

FIG. 1A schematically shows a front perspective view of an illustrative example electronic device 100a with an annular sensor 120a, arranged in accordance with at least some embodiments described herein. As depicted in FIG. 1A, electronic device 100a may include a through-hole 110a penetrating through electronic device 100a. Further, annular sensor 120a may be mounted on a surface of through-hole 110a, and configured to receive a touch input from a user. Although FIG. 1A illustrates that through-hole 110a is located at a center lower side of electronic device 100a, those skilled in the art will recognize that through-hole 110a may be disposed at any place of electronic device 100a.

Figure 1B:
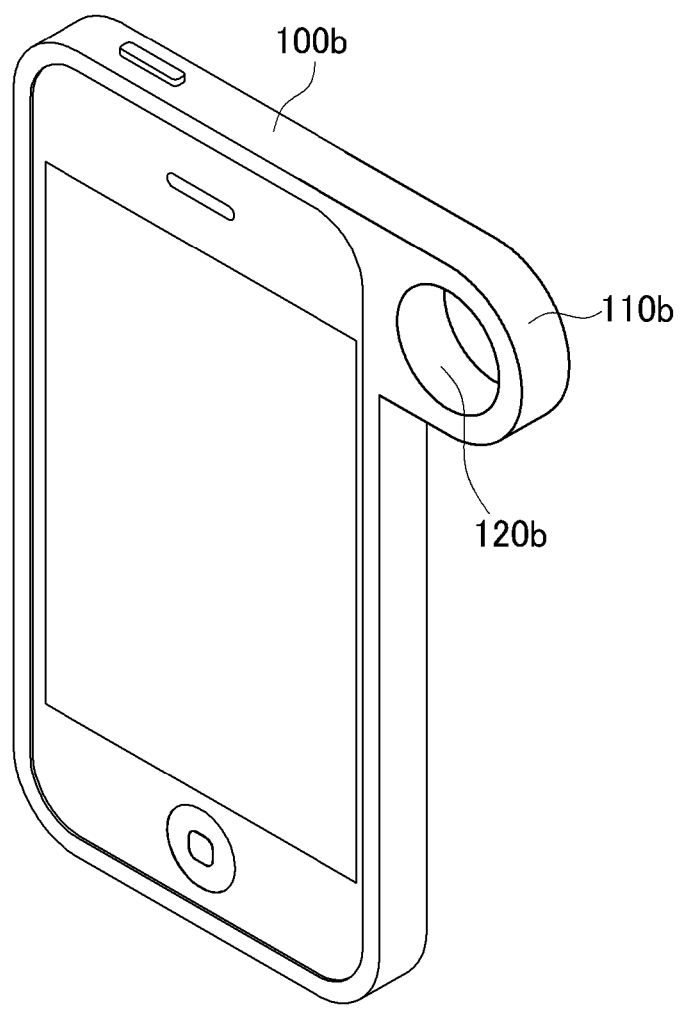
FIG. 1B schematically shows a front perspective view of another illustrative example electronic device with an annular sensor.

FIG. 1B schematically shows a front perspective view of another illustrative example electronic device 100b with an annular sensor 120b, arranged in accordance with at least some embodiments described herein. As depicted in FIG. 1B, electronic device 100b may include a ring-shaped member 110b. Further, annular sensor 120b may be mounted to an inside surface of ring-shaped member 110b, and configured to receive a touch input from a user. Although FIG. 1B illustrates that ring-shaped member 110b is disposed on an upper right side of electronic device 100b, ring-shaped member 110b may be disposed at any place on any surface of electronic device 100b. Further, although FIG. 1B illustrates that ring-shaped member 110b is disposed such that a central axis of ring-shaped member 110b is perpendicular to a front side of electronic device 100b, ring-shaped member 110b may be disposed in any other orientation (for example, ring-shaped member 110b may be disposed such that the central axis of ring-shaped member 110b is substantially parallel to a longitudinal side of electronic device 100b or a lateral side of electronic device 100b).

Figure 1C:
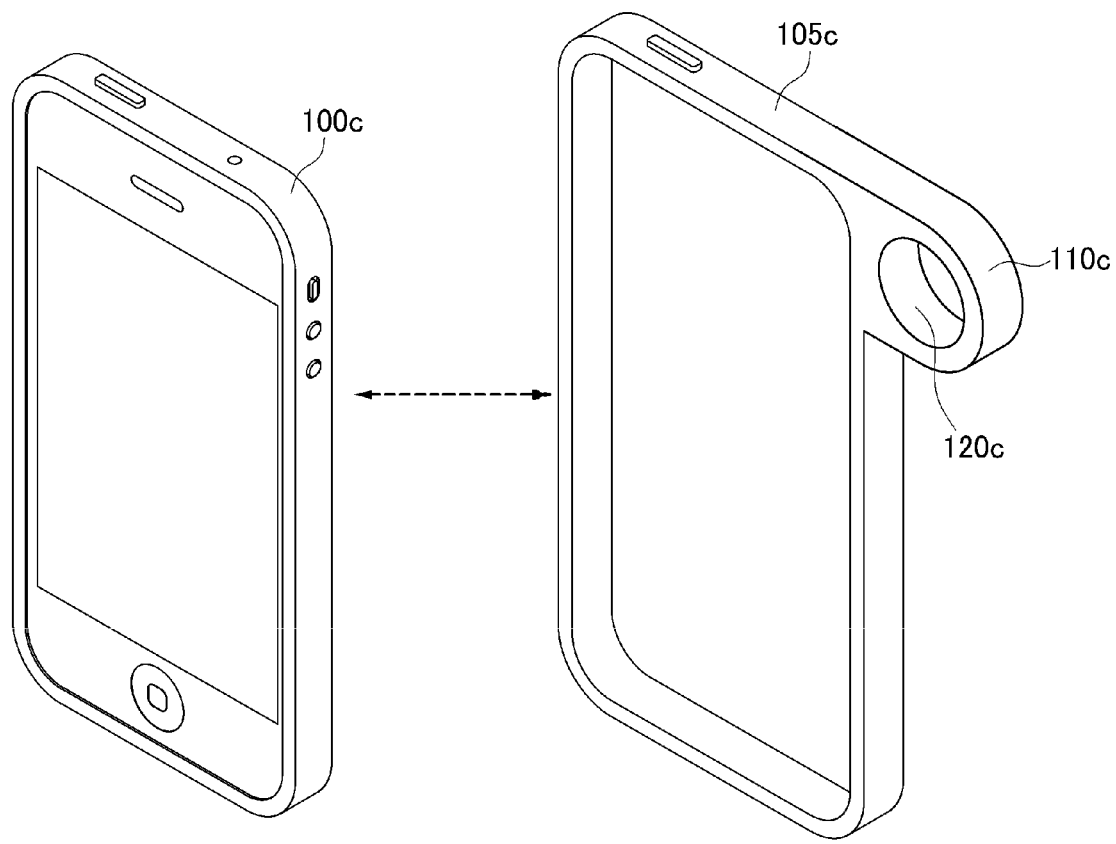
FIG. 1C schematically shows a front perspective view of an illustrative example case with an annular sensor configured to house an electronic device.

FIG. 1C schematically shows a front perspective view of an illustrative example case 105c with an annular sensor 120c configured to house an electronic device 100c, arranged in accordance with at least some embodiments described herein. As depicted in FIG. 1C, case 105c may include a ring-shaped member 110c. Further, annular sensor 120c may be mounted to an inside surface of ring-shaped member 110c, and configured to receive a touch input from a user. In some embodiments, annular sensor 120c may communicate with electronic device 100c using a wireless protocol such as, for example, Bluetooth, Wi-Fi, RF (radio frequency), Zigbee, infrared, or etc., when case 105c houses electronic device 100c. In such cases, electronic device 100c may be configured to receive the touch input from annular sensor 120c using the wireless protocol. Also, in some embodiments, electronic device 100c may supply power to annular sensor 120c wirelessly via, for example, an RF power transmission. Ring-shaped member 110c may be disposed at any place on any surface of case 105c, and in any orientation. In some other embodiments, annular sensor 120c may be connected to electronic device 100c when case 105c houses electronic device 100c. In such cases, case 105c may include a connector (not shown) which may be operatively connected to annular sensor 120c and may be communicatively coupled to electronic device 100c. Further, electronic device 100c may include a receiver (not shown) to which the connector may be physically inserted and electronically connected when case 105c houses electronic device 100c, and the receiver may be operatively connected to, for example, a bus interface of electronic device 100c, such as a USB, a mini-USB, a micro-USB, etc. The bus interface may supply power to the receiver so that annular sensor 120c can operate and communicate with electronic device 100c.

Electronic devices 100a-100c may be of any type of portable electronic device including, for example, a smartphone, a mobile phone, a personal digital assistant (PDA), a tablet, a laptop, a mobile game console, etc. Annular sensors 120a-120c may include, but is not limited to, a pressure sensor that may be configured to detect a pressure associated with operation of the annular sensor by the user, and/or a capacitive sensor that may be configured to detect a contact between the annular sensor and the user associated with operation of the annular sensor by the user. That is, annular sensors 120a-120c may include a single layer of the pressure sensor, or a single layer of the capacitive sensor, or a layered structure of the pressure sensor and the capacitive sensor.

Figure 1D:
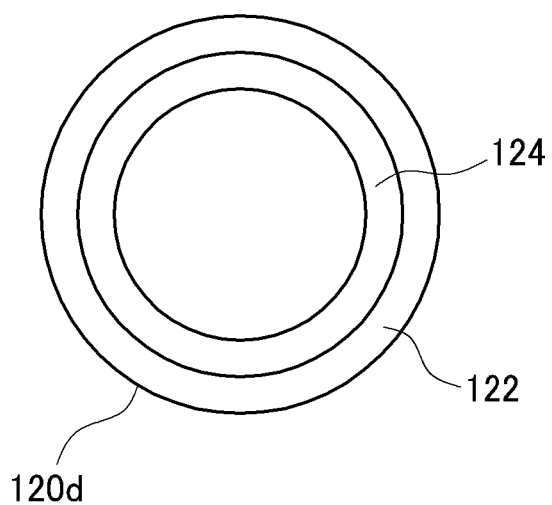
FIG. 1D schematically shows a sectional view of an illustrative example structure of an annular sensor.

FIG. 1D schematically shows a sectional view of an illustrative example structure of an annular sensor 120d, arranged in accordance with at least some embodiments described herein. As depicted in FIG. 1D, annular sensor 120d may include a layered structure of a pressure sensor 122 and a capacitive sensor 124. Pressure sensor 122 may be configured to detect a pressure associated with operation of annular sensor 120d by the user, while capacitive sensor 124 may be configured to detect a contact between capacitive sensor 124 and the user associated with operation of annular sensor 120d. In some embodiments, pressure sensor 122 may be mounted to the surface of through-hole 110a (in FIG. 1A) or the inside surface of ring-shaped member 110b or 110c (in FIG. 1B or 1C), and capacitive sensor 124 may be mounted to an inside surface of pressure sensor 122'.

Figure 1E:
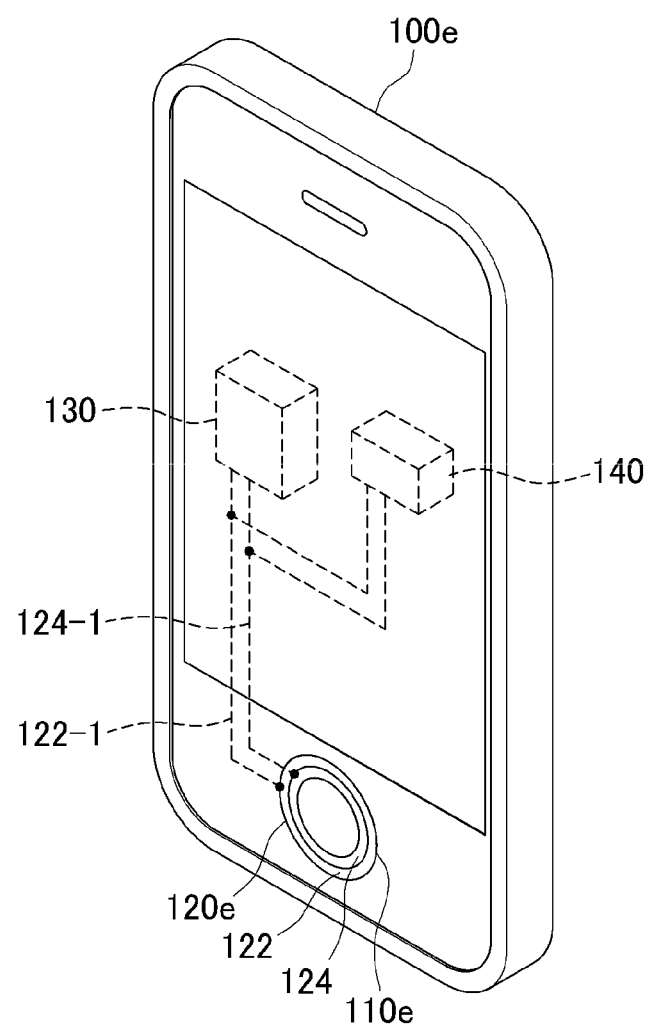
FIG. 1E schematically shows a front perspective view of an illustrative example electronic device with an annular sensor, a processor and a memory.

FIG. 1E schematically shows a front perspective view of an illustrative example electronic device 100e with an annular sensor 120e, a processor 130 and a memory 140, arranged in accordance with at least some embodiments described herein. As depicted in FIG. 1E, annular sensor 120e may be mounted to the surface of a through-hole 110e and may include the layered structure of pressure sensor 122 and capacitive sensor 124 as described above with reference to FIG. 1D. Pressure sensor 122 and capacitive sensor 124 may be communicatively connected to processor 130 and memory 140 via a lead 122-1 and a lead 124-1, respectively.

Processor 130 may be configured to communicate and/or interact with pressure sensor 122 and capacitive sensor 124, as will be described with reference FIG. 3A below. Processor 130 may be configured to determine an action by the user that corresponds to the touch input detected by annular sensor 120e. In some embodiments, processor 130 may be further configured to determine the action by the user based at least in part on one or more of touch positions (e.g., angular positions) and touch times associated with the touch input. For instance, processor 130 may be configured to transform the touch input into a matrix, each element of which may correspond to a value indicating a touch by the user at corresponding angular touch position and touch time, then determine the action based on similarities between the transformed matrix and predetermined matrices corresponding to candidate actions (as will be discussed in further detail below). In the example embodiments where annular sensor 120e includes pressure sensor 122, processor 130 may also take consideration of pressures associated with the detected touch input. In such cases, each element of the matrix may correspond to a value of pressure detected by pressure sensor 122 at corresponding angular touch position and touch time.

In some embodiments, annular sensor 120e may also communicate and/or interact with memory 140 of electronic device 100e. Memory 140 may be configured to store the touch input detected by annular sensor 120e. Memory 140 may also be configured to store a list of candidate actions. In such cases, processor 130 may be configured to determine the action by the user, amongst the candidate actions, for example, a click action, a rotation action, a grip action, etc.

Figure 2A:
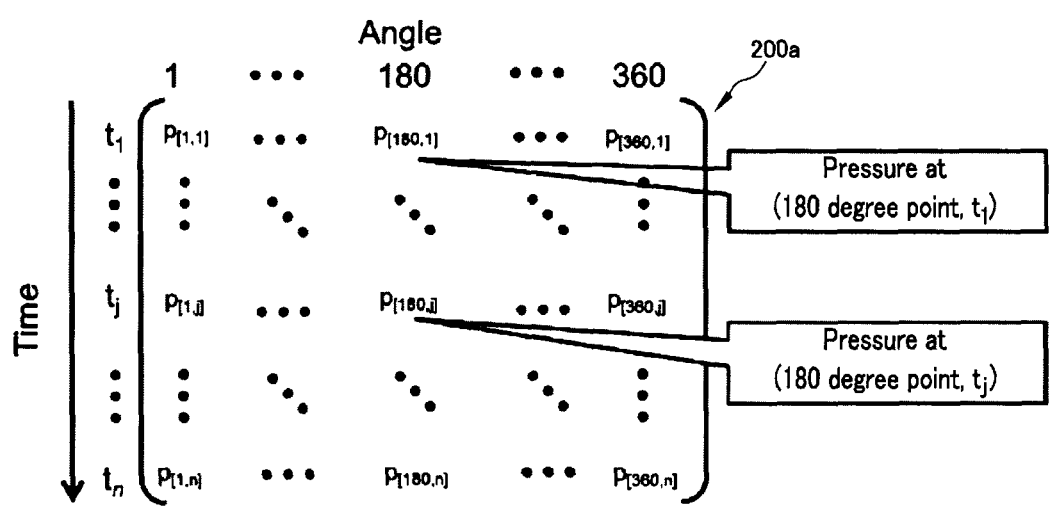
FIG. 2A shows an illustrative example matrix that corresponds to a touch input detected by an annular sensor.

FIG. 2A shows an illustrative example matrix 200a that corresponds to a touch input detected by an annular sensor, arranged in accordance with at least some embodiments described herein. In some embodiments, a processor of electronic device 100a, 100b or 100c (shown in FIGS. 1A-1C) may be configured to transform the touch input into a matrix as illustrated in FIG. 2A. Further, in some embodiments, a memory of electronic device 100a, 100b or 100c may be configured to store the matrix corresponding to the touch input as illustrated in FIG. 2A. By way of example, but not limitation, each column of matrix 200a may denote an angular touch position (e.g., from 1 degree point to 360 degree point) associated with the touch input, and each row of matrix 200a may denote a touch time (e.g., from $t_1$ to $t_n$) associated with the touch input.

In some embodiments where annular sensor 120a, 120b or 120c (shown in FIGS. 1A-1C) includes the pressure sensor, each element of matrix 200a may correspond to a value of pressure detected by the pressure sensor at corresponding angular touch position and touch time. By way of example, but not limitation, p[180,1] of matrix 200a may indicate the pressure at the angular touch position of 180 degree point and at the touch time of $t_1$, and p[180,j] of matrix 200a may indicate the pressure at the angular touch position of 180 degree point and at the touch time of $t_j$. In some embodiments, the values of pressure may be normalized into a range of 0 to 1. In such cases, 1 may correspond to a maximum pressure that can be detected by the pressure sensor, 0.5 may correspond to a half of the maximum pressure, and 0 may correspond to zero pressure (i.e., no touch). In some other embodiments, the values of pressure may be scaled values that may range between any two values (for example, a 8-bit value of between 0 and 255).

In some alternative embodiments where annular sensor 120a, 120b or 120c does not include the pressure sensor, but include the capacitive sensor, each element of matrix 200a may correspond to a value indicating whether the capacitive sensor detects the contact with the user. For instance, each element of matrix 200a may correspond to 1 when the capacitive sensor detects the contact with the user, and 0 when the capacitive sensor does not detect the contact. In some alternative embodiments where annular sensor 120a, 120b or 120c has both of the pressure sensor and the capacitive sensor, each element of matrix 200a may correspond to a weighted sum of the value of pressure detected by the pressure sensor and the value indicating whether the capacitive sensor detects the contact with the user.

Figure 2B:
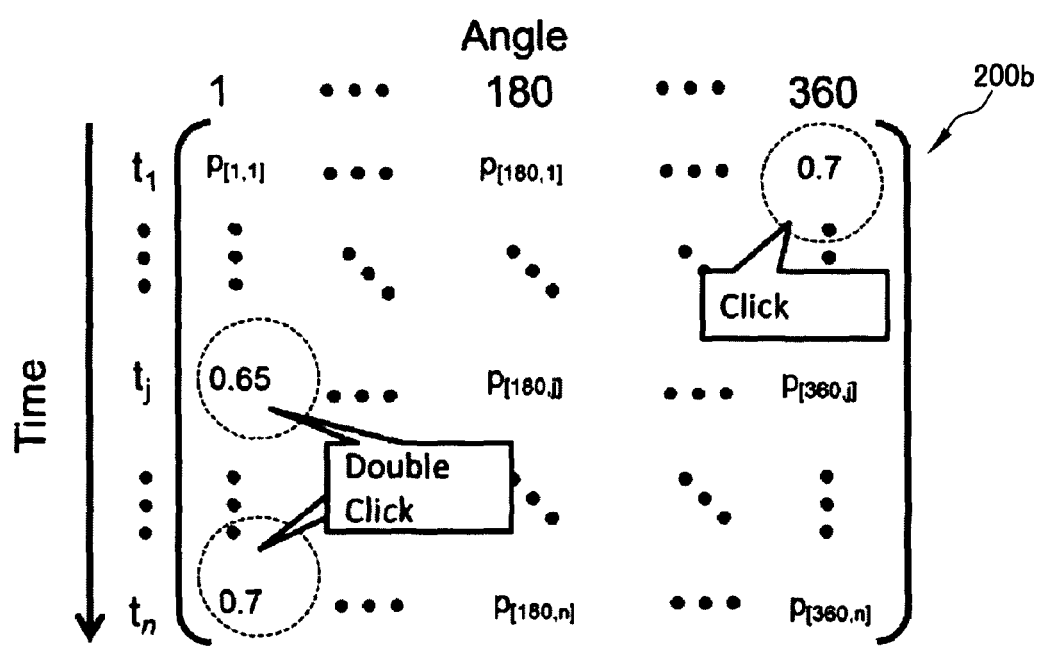
FIGS. 2B-2D respectively show illustrative example matrices that correspond to touch inputs detected by an annular sensor and associated with illustrative example user's actions.
Figure 2C:
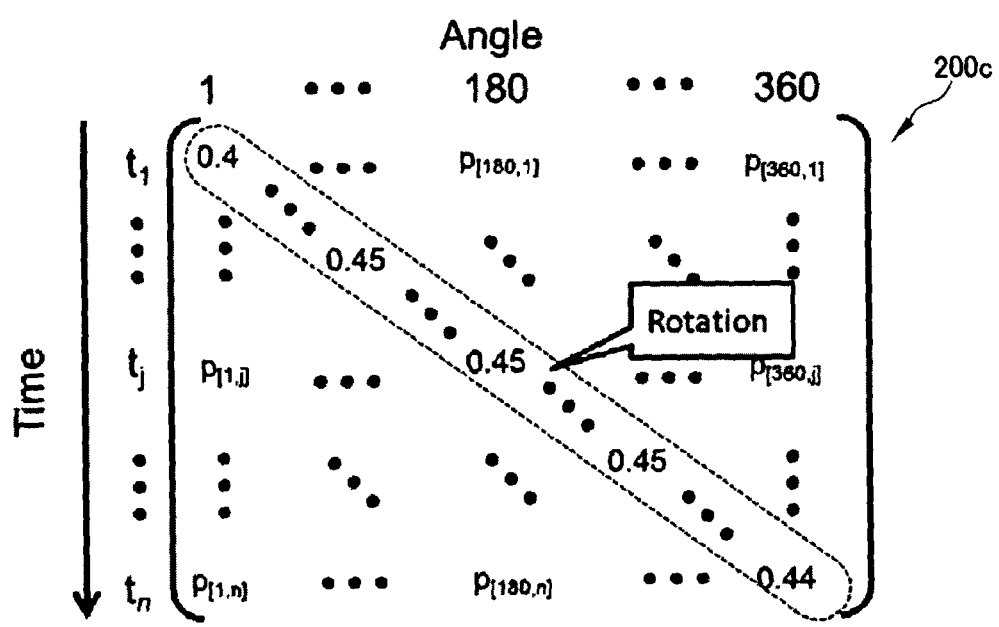
Figure 2D:
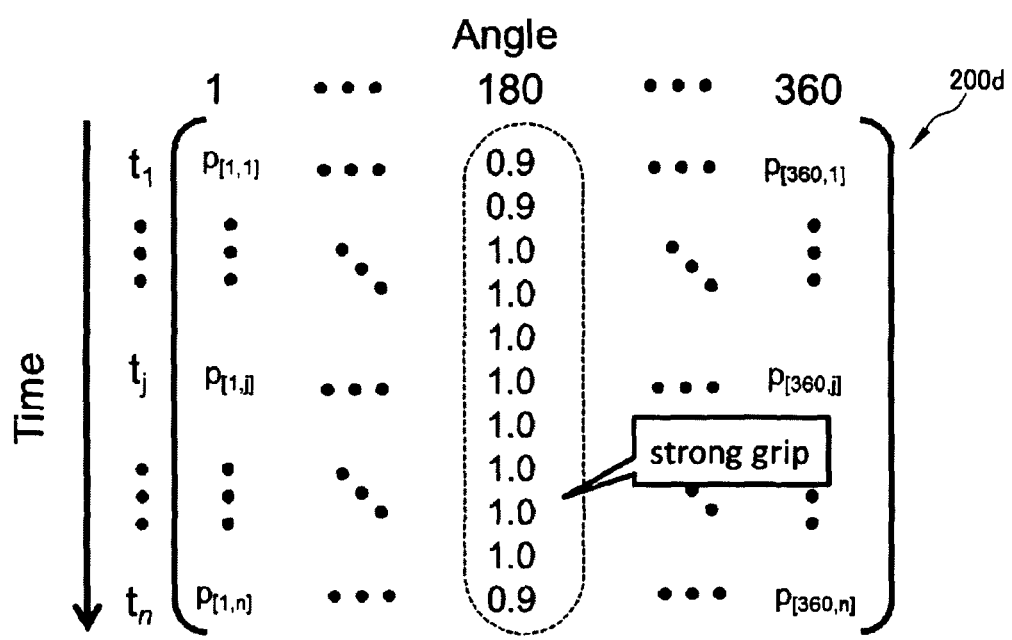

FIGS. 2B-2D respectively show illustrative example matrices 200b-200d that correspond to touch inputs detected by an annular sensor and associated with illustrative example user's actions, arranged in accordance with at least some embodiments described herein. By way of example, but not limitation, when the touch input corresponds to matrix 200b illustrated in FIG. 2B, the processor of electronic device 100a, 100b or 100c may operatively detect a click action at the angular touch position of 360 degree point, and a double click action at the angular touch position of 1 degree point. When the touch input corresponds to matrix 200c illustrated in FIG. 2C, the processor of electronic device 100a, 100b or 100c may detect a rotation action. When the touch input corresponds to matrix 200d illustrated in FIG. 2D, the processor of electronic device 100a, 100b or 100c may operably detect a grip action at the angular touch position of 180 degree point.

In some embodiments, the memory of electronic device 100a, 100b or 100c may also be configured to store the candidate actions in forms of matrices as illustrated in FIGS. 2A-2D. In such cases, the processor of electronic device 100a, 100b or 100c may compare the matrix corresponding to the touch input with the matrices corresponding to the candidate actions, and select one of the candidate actions that have a highest computed similarity as the action corresponding to the touch input.

By way of example, but not limitation, when M denotes the matrix corresponding to the touch input, and A denotes one of the matrices corresponding to the candidate actions, the processor may calculate the similarity r between matrices M and A, as follows:

$$r = \sum_{j=1}^{n} \sum_{i=1}^{360} M_{j,i} \cdot A_{j,i},$$

where $M_{j,i}$ and $A_{j,i}$ respectively denote an element of jth row (i.e., corresponding to $t_j$) and ith column (i.e., corresponding to i degree point) of matrices M and A, and n denotes a time duration used for capturing the touch input. The processor may calculate the similarity for each of the candidate actions as above, and select the one of the candidate actions with the highest similarity.

Figure 3A:
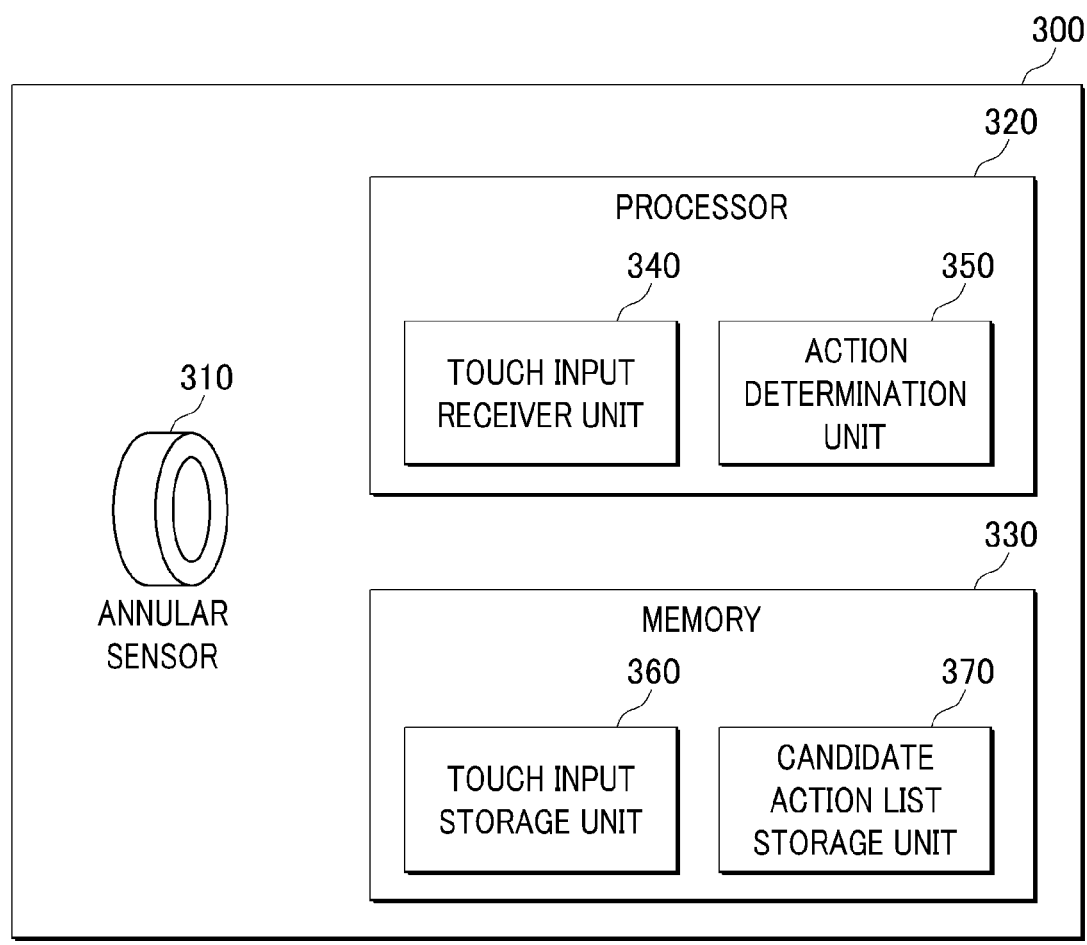
FIG. 3A schematically shows a block diagram of an illustrative example electronic device configured to detect a user's action with an annular sensor.

FIG. 3A schematically shows a block diagram of an illustrative example electronic device 300 configured to detect a user's action with an annular sensor 310, arranged in accordance with at least some embodiments described herein.

As depicted in FIG. 3A, electronic device 300 may include annular sensor 310, which may be configured to detect a touch input from a user, as electronic device 100a or 100b illustrated in FIGS. 1A-1B. However, it will be recognized that in some other embodiments, electronic device 300 may not physically include annular sensor 310, but may be configured to communicate and/or interact with annular sensor 310 as electronic device 100c illustrated in FIG. 1C.

As depicted in FIG. 3A, electronic device 300 may include a processor 320 and a memory 330. Processor 320 may include one or more components such as a touch input receiver unit 340 and/or an action determination unit 350, while memory 330 may include one or more components such as a touch input storage unit 360 and/or a candidate action list storage unit 370. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Touch input receiver unit 340 may be configured to receive the touch input from annular sensor 310. In some embodiments, touch input receiver unit 340 may be configured to receive data indicating touch positions and data indicating touch times associated with the detected touch input from annular sensor 310. In some embodiments where annular sensor 310 includes a pressure sensor, touch input receiver unit 340 may be further configured to receive data indicating pressures associated with the touch input, as well as the data indicating touch positions and touch times.

In some embodiments where electronic device 300 does not physically include annular sensor 310, touch input receiver unit 340 may be configured to receive the touch input from annular sensor 310 wirelessly. By way of example, but not limitation, touch input receiver unit 340 may receive the touch input from annular sensor 310 using a wireless protocol such as, for example, Bluetooth, Wi-Fi, RF (radio frequency), Zigbee, infrared, or etc.

Action determination unit 350 may be configured to determine the user's action that corresponds to the touch input received by touch input receiver unit 340, based at least in part on the touch input and a list of candidate actions. In some embodiments, the list of candidate actions may be stored in candidate action list storage unit 370, in forms of matrices (e.g., in forms of matrices 200b-200d shown in FIGS. 2B-2D).

In some embodiments, action determination unit 350 may be configured to determine the user's action based at least in part on one or more of the data indicating touch positions and touch times received by touch input receiver unit 340. In some embodiments where annular sensor 310 includes the pressure sensor, action determination unit 350 may be configured to determine the user's action based at least in part on one or more of the data indicating touch positions, touch times and pressures received by touch input receiver unit 340.

In some embodiments, action determination unit 350 may generate a matrix M corresponding to the touch input (e.g., matrix 200a shown in FIG. 2A), and compute similarity r between the touch input and each of the candidate actions corresponding to matrix A, by calculating the below:

$$r = \sum_{j=1}^{n} \sum_{i=1}^{360} M_{j,i} \cdot A_{j,i},$$

where $M_{j,i}$ and $A_{j,i}$ respectively denote an element of $j^{th}$ row (i.e., corresponding to $t_j$) and $i^{th}$ column (i.e., corresponding to i degree point) of matrices M and A, and n denotes a time duration used for capturing the touch input. Then, action determination unit 350 may select one of the candidate actions that have a highest computed similarity. In some embodiments, action determination unit 350 may select the candidate actions based on an application executed on electronic device 300 such that different applications correspond to different candidate actions.

Touch input storage unit 360 may be configured to store the touch input received by touch input receiver unit 340. Further, candidate action list storage unit 370 may be configured to store the list of candidate actions. In some embodiments, action determination unit 350 may receive the touch input from touch input storage unit 360 and the list of candidate actions from candidate action list storage unit 370, and compare the touch input and the list of candidate actions to determine the user's action that corresponds to the touch input.

Figure 3B:
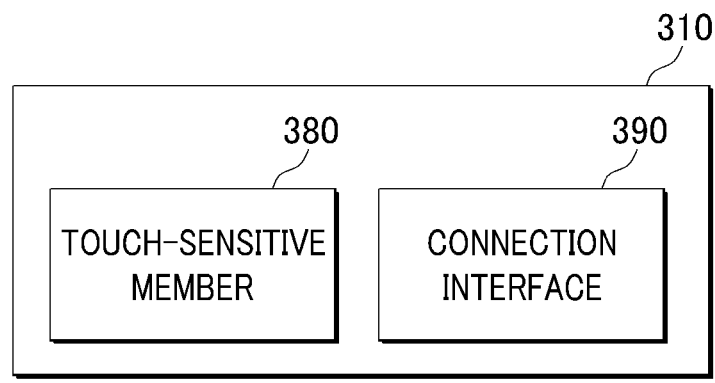
FIG. 3B schematically shows a block diagram of an illustrative example annular sensor configured to detect a user's action.

FIG. 3B schematically shows a block diagram of an illustrative example annular sensor 310 configured to detect a user's action, arranged in accordance with at least some embodiments described herein.

As depicted in FIG. 3B, annular sensor 310 may include one or more components such as a touch-sensitive member 380 and a connection interface unit 390.

Touch-sensitive member 380 may be configured to detect a touch input by detecting changes in pressure and/or capacitance due to being contacted by an object (e.g., a finger of a user). Touch-sensitive member 380 may be mounted to an inside surface of ring-shaped member of annular sensor 310.

Connection interface unit 390 may be configured to communicate with processor 320 and memory 330 of electronic device 300. In some embodiments, connection interface unit 390 may be configured to transmit, to touch input receiver unit 340, the touch input detected by touch-sensitive member 380. In some embodiments where electronic device 300 does not physically include annular sensor 310, connection interface unit 390 may be configured to wirelessly transmit the touch input to touch input receiver unit 340. By way of example, but not limitation, connection interface unit 390 may be configured to wirelessly transmit the touch input to touch input receiver unit 340 using a wireless protocol such as, for example, Bluetooth, Wi-Fi, RF (radio frequency), Zigbee, infrared, or etc. In some further embodiments, connection interface unit 390 may also be configured to receive power from electronic device 300 wirelessly via, for example, an RF power transmission.

Figure 4:
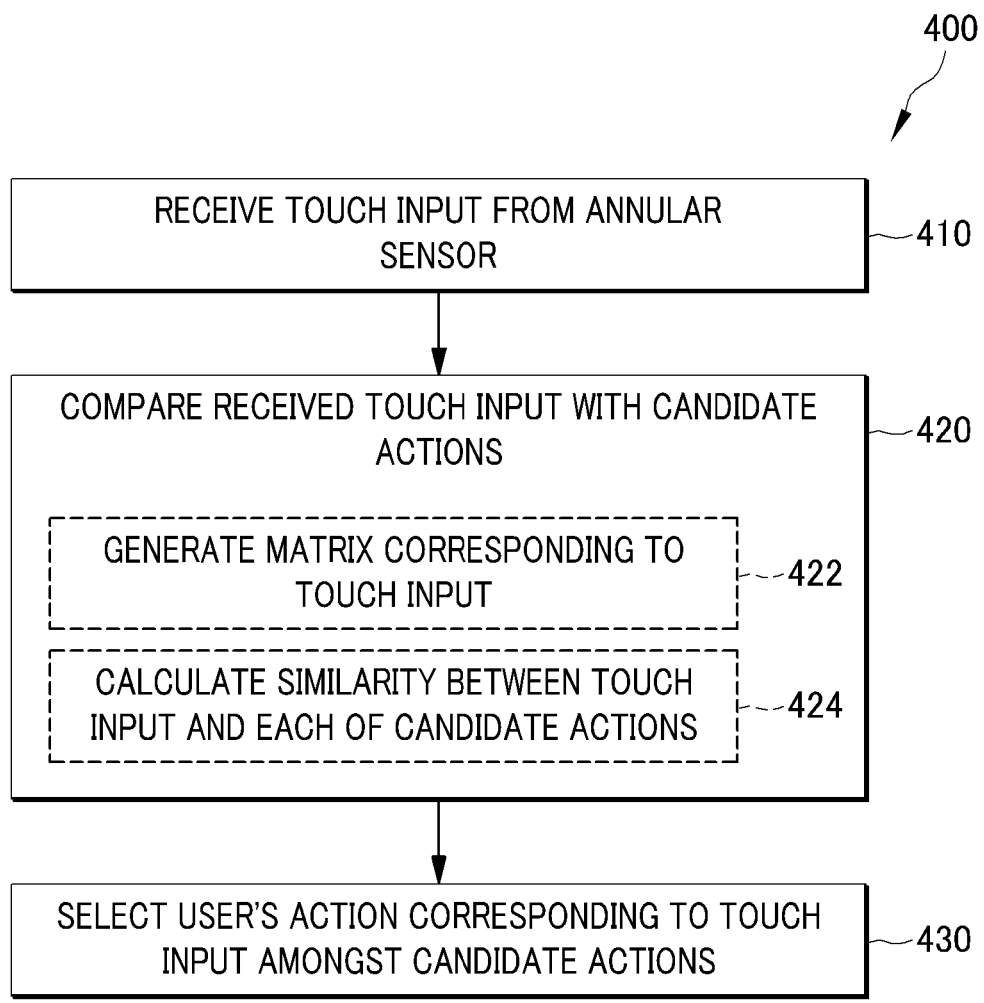
FIG. 4 schematically shows an example flow diagram of a method for detecting a user's action with an annular sensor.

FIG. 4 schematically shows an example flow diagram of a method 400 for detecting a user's action with an annular sensor, arranged in accordance with at least some embodiments described herein.

Method 400 may be implemented in an electronic device such as electronic device 300 including a touch input receiver unit 340, an action determination unit 350, a touch input storage unit 360 and/or a candidate action list storage unit 370. Method 400 may include one or more operations, actions, or functions as illustrated by one or more of blocks 410, 420 and/or 430. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 400 may begin at block 410, "RECEIVE TOUCH INPUT FROM ANNULAR SENSOR."

At block 410, the electronic device (e.g., touch input receiver unit 340 in FIG. 3A) may be adapted to receive a touch input from the annular sensor (e.g., annular sensor 310 in FIGS. 3A-B). Block 410 may be followed by block 420, "COMPARE RECEIVED TOUCH INPUT WITH CANDIDATE ACTIONS."

At block 420, the electronic device (e.g., action determination unit 350 in FIG. 3A) may be adapted to compare the received touch input with candidate actions (e.g., corresponding to matrices 200b-200d shown in FIGS. 2B-2D). In some embodiments, block 420 may include block 422 "GENERATE MATRIX CORRESPONDING TO TOUCH INPUT" and block 424 "CALCULATE SIMILARITY BETWEEN TOUCH INPUT AND EACH OF CANDIDATE ACTIONS." The electronic device may generate a matrix corresponding to the touch input (e.g., matrix 200a shown in FIG. 2A) at block 422, and compute similarity between the touch input and each of the candidate actions at block 424, based on the matrix calculation described above with reference to FIGS. 2-3. Block 420 may be followed by block 430, "SELECT USER'S ACTION CORRESPONDING TO TOUCH INPUT AMONGST CANDIDATE ACTIONS."

At block 430, the electronic device (e.g., action determination unit 350) may be adapted to select the user's action corresponding to the touch input amongst the candidate actions based at least in part on the comparison. In some embodiments, the electronic device may select one of the candidate actions that has a highest similarity, based on the similarities between the touch input and the respective candidate actions calculated at block 424. When the electronic device determines the user's action corresponding to the touch input, the electronic device may provide the user with a desired response corresponding to the determined user's action.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
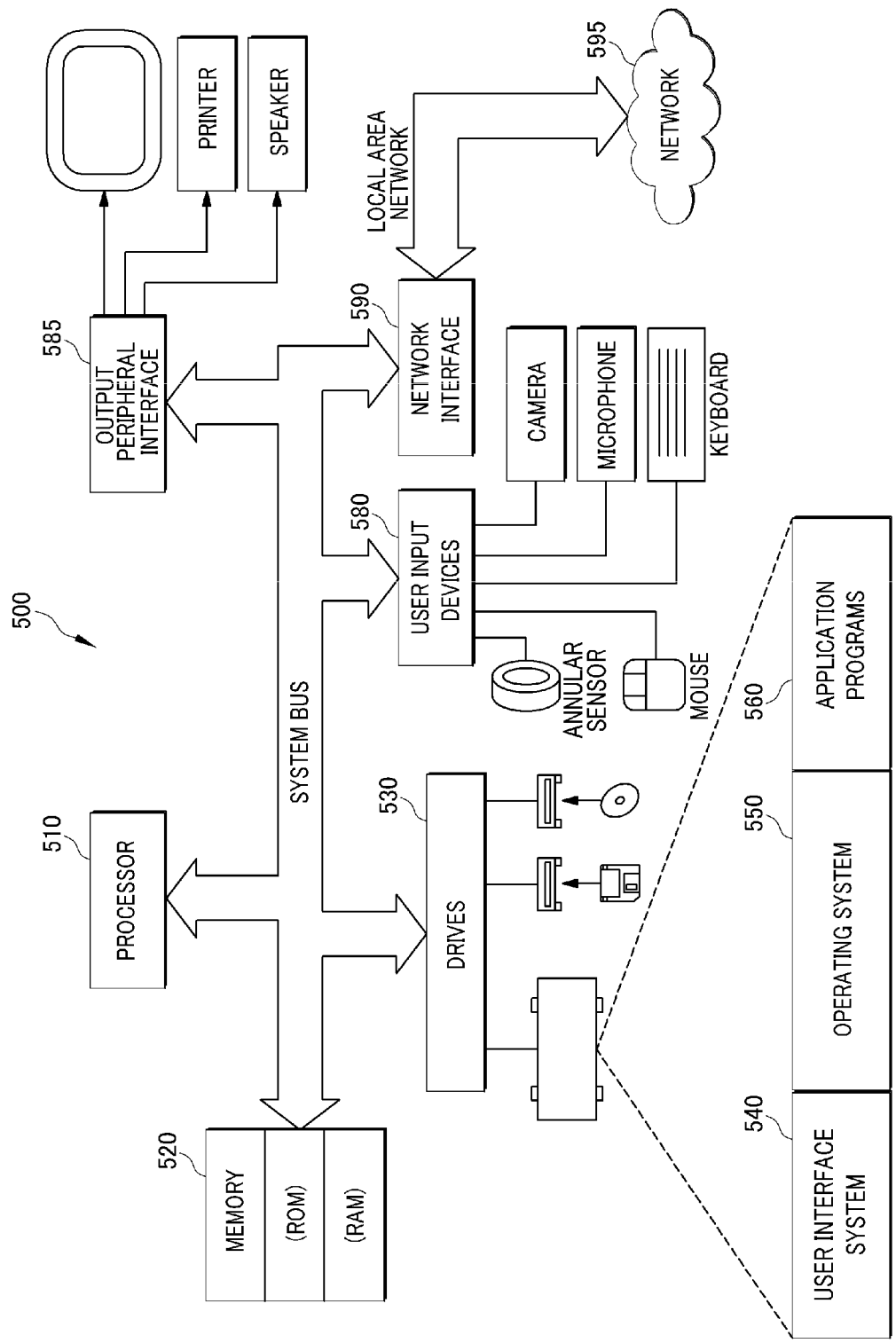
FIG. 5 shows a schematic block diagram illustrating an example computing system that may be configured to perform methods for detecting a user's action with an annular sensor.

FIG. 5 shows a schematic block diagram illustrating an example computing system that may be configured to perform methods for detecting a user's action with an annular sensor, arranged in accordance with at least some embodiments described herein. As depicted in FIG. 5, a computer 500 may include a processor 510, a memory 520 and one or more drives 530. Computer 500 may be implemented as a conventional computer system, an embedded control computer, a laptop, or a server computer, a mobile device, a set-top box, a kiosk, a vehicular information system, a mobile telephone, a customized machine, or other hardware platform.

Drives 530 and their associated computer storage media may provide storage of computer readable instructions, data structures, program modules and other data for computer 500. Drives 530 may include a user interface system 540, an operating system (OS) 550, and application programs 560. User interface system 540 may be adapted to control an electronic device as described above.

Computer 500 may further include user input devices 580 through which a user may enter commands and data. Input devices may include an electronic digitizer, a camera, a microphone, a keyboard, pointing device, commonly referred to as a mouse, trackball or touch pad, and an annular sensor. Other input devices may include a joystick, game pad, satellite dish, scanner, or the like.

These and other input devices may be coupled to processor 510 through a user input interface that is coupled to a system bus, but may be coupled by other interface and bus structures, such as a parallel port, game port or a universal serial bus (USB). Computers such as computer 500 may also include other peripheral output devices such as display devices, which may be coupled through an output peripheral interface 585 or the like.

Computer 500 may operate in a networked environment using logical connections to one or more computers, such as a remote computer coupled to a network interface 590. The remote computer may be a personal computer, a server, a router, a network PC, a peer device or other common network node, and may include many or all of the elements described above relative to computer 500.

Networking environments are commonplace in offices, enterprise-wide area networks (WAN), local area networks (LAN), intranets, and the Internet. When used in a LAN or WLAN networking environment, computer 500 may be coupled to the LAN through network interface 590 or an adapter. When used in a WAN networking environment, computer 500 typically includes a modem or other means for establishing communications over the WAN, such as the Internet or a network 595. The WAN may include the Internet, the illustrated network 595, various other networks, or any combination thereof. It will be appreciated that other mechanisms of establishing a communications link, ring, mesh, bus, cloud, or network between the computers may be used.

In some embodiments, computer 500 may be coupled to a networking environment. Computer 500 may include one or more instances of a physical computer-readable storage medium or media associated with drives 530 or other storage devices. The system bus may enable processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as storage drives 530 or otherwise. Hard drive implementations may be characterized as solid state, or may include rotating media storing magnetically encoded information.

Processor 510 may be constructed from any number of transistors or other circuit elements, which may individually or collectively assume any number of states. More specifically, processor 510 may operate as a state machine or finite-state machine. Such a machine may be transformed to a second machine, or specific machine by loading executable instructions. These computer-executable instructions may transform processor 510 by specifying how processor 510 transitions between states, thereby transforming the transistors or other circuit elements constituting processor 510 from a first machine to a second machine. The states of either machine may also be transformed by receiving input from user input devices 580, network interface 590, other peripherals, other interfaces, or one or more users or other actors. Either machine may also transform states, or various physical characteristics of various output devices such as printers, speakers, video displays, or otherwise.

Figure 6:
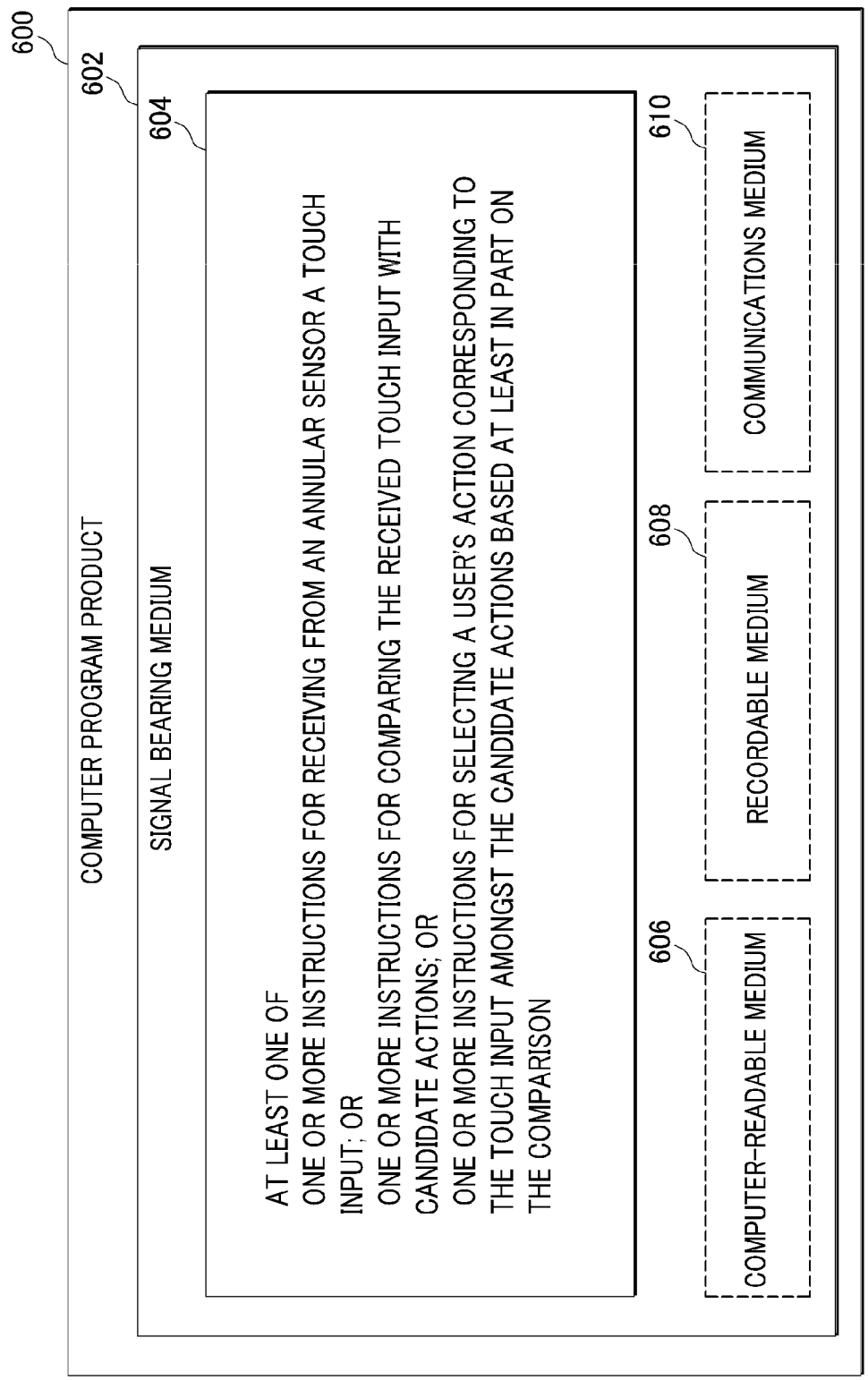
FIG. 6 illustrates computer program products that may be utilized to detect a user's action, all arranged in accordance with at least some embodiments described herein.

FIG. 6 illustrates computer program products 600 that may be utilized to detect a user's action, in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1 to 5. By way of example, instructions 604 may include: one or more instructions for receiving from an annular sensor a touch input; one or more instructions for comparing the received touch input with candidate actions; or one or more instructions for selecting a user's action corresponding to the touch input amongst the candidate actions based at least in part on the comparison. Thus, for example, referring to FIG. 3A, processor 320 of electronic device 300 may undertake one or more of the blocks shown in FIG. 4 in response to instructions 604.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of electronic device 300 by an RF signal bearing medium 602, where the signal bearing medium 602 is conveyed by a wireless communications medium 610 (e.g., a wireless communications medium conforming with the IEEE 802.11 standard).

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An electronic device operable by a user, the electronic device comprising:
    an annular sensor configured to detect a touch input;
    a ring-shaped member that includes an inside surface, wherein the annular sensor is mounted on the inside surface of the ring-shaped member; and
    a processor operatively coupled to the annular sensor, wherein the processor is configured to:
        compare a first matrix associated with the touch input detected by the annular sensor with a second matrix associated with a candidate action; and
        determine, based on the comparison, a user action that corresponds to the touch input detected by the annular sensor mounted on the inside surface of the ring-shaped member,
    wherein the determination of the user action, via the annular sensor mounted on the inside surface of the ring-shaped member, facilitates intended selection of items displayed on the electronic device, which leads to enhancement in user experience while the user provides one or more touch inputs, and
    wherein the annular sensor and the ring-shaped member enable the user to securely hold the electronic device to thereby reduce damage that would otherwise be due to slippage of the electronic device from a hand of the user.

2. The electronic device of claim 1, further comprising:
    a memory operatively coupled to the annular sensor and configured to store information that represents the touch input detected by the annular sensor.

3. The electronic device of claim 1, wherein the processor is configured to determine the user action based, at least in part, on one or more of touch positions and touch times associated with the touch input detected by the annular sensor.

4. The electronic device of claim 3, wherein the annular sensor is configured to provide one or more of the touch positions as an angular position associated with the detected touch input.

5. The electronic device of claim 1, wherein the annular sensor includes a pressure sensor that is configured to detect a pressure associated with operation of the annular sensor by the user.

6. The electronic device of claim 5, wherein the processor is further configured to determine the user action based, at least in part, on one or more of touch positions, touch times, and pressures associated with the touch input detected by the annular sensor.

7. The electronic device of claim 1, wherein the annular sensor includes a capacitive sensor.

8. The electronic device of claim 1, wherein the processor is configured to compare the touch input detected by the annular sensor with candidate actions to determine the user action from amongst the candidate actions.

9. The electronic device of claim 8, wherein the processor is configured to select the user action from amongst the candidate actions based on an executable application on the electronic device, and wherein different applications correspond to different candidate actions.

10. The electronic device of claim 1, wherein the ring-shaped member is provided as a through-hole that is penetrated through a surface of the electronic device.

11. An electronic device configured to detect user action with an annular sensor mounted on an inside surface of a ring-shaped member, the electronic device comprising:
  a touch input receiver unit coupled to the annular sensor and configured to receive a touch input from the annular sensor, wherein the annular sensor comprises at least two sensors; and
  an action determination unit coupled to the touch input receiver unit and configured to determine the user action that corresponds to the touch input received by the touch input receiver unit, based, at least in part, on a comparison between a matrix associated with the touch input and any of a plurality of matrices associated with a list of candidate actions, wherein each element of the matrix, associated with the touch input, corresponds to a weighted sum of values of the at least two sensors, and
  wherein the determination of the user action, via the annular sensor mounted on the inside surface of the ring-shaped member, facilitates intended selection of items displayed on the electronic device, which leads to enhancement in user experience while a user of the electronic device provides one or more touch inputs.

12. The electronic device of claim 11, wherein the annular sensor is configured to detect the touch input from the user.

13. The electronic device of claim 11, wherein the touch input receiver unit is configured to receive touch positions and touch times associated with the touch input from the annular sensor, and
  wherein the action determination unit is configured to determine the user action based, at least in part, on one or more of the touch positions and the touch times.

14. The electronic device of claim 13, wherein the annular sensor is configured to provide one or more of the touch positions as an angular position associated with the touch input.

15. The electronic device of claim 11, wherein the at least two sensors include a pressure sensor that is configured to detect a pressure associated with the touch input.

16. The electronic device of claim 15, wherein the touch input receiver unit is configured to receive touch positions, touch times, and pressures associated with the touch input from the annular sensor, and
  wherein the action determination unit is configured to determine the user action based, at least in part, on one or more of the touch positions, the touch times, and the pressures.

17. The electronic device of claim 11, wherein the at least two sensors include a capacitive sensor.

18. The electronic device of claim 11, wherein the action determination unit is configured to compute similarity between the touch input and each of the candidate actions, and select one of the candidate actions that has a highest computed similarity.

19. The electronic device of claim 11, wherein the action determination unit is configured to select the user action from amongst the candidate actions based on an executable application on the electronic device, and wherein different applications correspond to different candidate actions.

20. The electronic device of claim 11, wherein the touch input receiver unit is configured to receive the touch input from the annular sensor wirelessly.

21. The electronic device of claim 11, further comprising:
  a touch input storage unit coupled to the touch input receiver unit and configured to store the received touch input.

22. The electronic device of claim 11, further comprising:
  a candidate action list storage unit coupled to the action determination unit and configured to store the list of candidate actions.

23. A method for an electronic device operatively coupled to an annular sensor mounted on an inside surface of a ring-shaped member and configured to detect a user action with the annular sensor, the method comprising:
  receiving, from the annular sensor which comprises a first sensor and a second sensor, a touch input;
  comparing the received touch input with candidate actions, wherein comparing the received touch input with the candidate actions comprises:
    generating a matrix associated with the received touch input; and
    calculating a similarity between the received touch input and each of the candidate actions by comparing a first value of each element of the generated matrix, associated with the received touch input, with a second value of any of a plurality of matrices associated with the candidate actions,
    wherein the first value of each element of the generated matrix corresponds to a weighted sum of a third value of the first sensor and a fourth value of the second sensor; and
  selecting the user action, which corresponds to the touch input, from amongst the candidate actions based, at least in part, on the comparison, wherein selecting the user action with the annular sensor mounted on the inside surface of the ring-shaped member facilitates intended selection of items displayed on the electronic device, which leads to enhancement in user experience while a user of the electronic device provides one or more touch inputs.

24. The method of claim 23, wherein
  selecting comprises selecting one of the candidate actions that has a highest computed similarity.

25. The method of claim 23, further comprising:
  storing the received touch input and the candidate actions in a memory of the electronic device.

26. The method of claim 23, further comprising:
  varying the candidate actions based on an application executed on the electronic device.

27. The method of claim 23, wherein the receiving, from the annular sensor which comprises the first sensor and the second sensor, the touch input comprises receiving the touch input from an annular sensor that comprises a pressure sensor and a capacitive sensor, wherein the third value corresponds to a pressure value detected by the pressure sensor, wherein the fourth value corresponds to a value detected by the capacitive sensor, and wherein the value detected by the capacitive sensor indicates whether the capacitive sensor detects a contact of the annular sensor with the user of the electronic device.

\* \* \* \* \*